(12) United States Patent
Okamura

(10) Patent No.: US 6,554,186 B1
(45) Date of Patent: Apr. 29, 2003

(54) PRODUCT INSPECTION DEVICE

(75) Inventor: Eiji Okamura, Tokyo (JP)

(73) Assignee: Leading Information Technology Institute, Inc.

( * ) Notice: Subject to any disclaimer, the term of this patent is extended or adjusted under 35 U.S.C. 154(b) by 0 days.

(21) Appl. No.: 09/746,848

(22) Filed: Dec. 21, 2000

(51) Int. Cl.$^7$ .............................................. G06K 15/00
(52) U.S. Cl. ...................................................... 235/383
(58) Field of Search ................................ 235/383, 385; 705/414, 28, 16

(56) References Cited

U.S. PATENT DOCUMENTS

| | | | | |
|---|---|---|---|---|
| 3,737,631 A | * | 6/1973 | Harris | 235/61.6 R |
| 4,373,133 A | * | 2/1983 | Clyne et al. | 235/383 |
| 4,787,467 A | * | 11/1988 | Johnson | 177/50 |
| 4,940,116 A | * | 7/1990 | O'Connor et al. | 186/61 |
| 4,959,530 A | * | 9/1990 | O'Connor | 235/383 |
| 5,239,167 A | * | 8/1993 | Kipp | 235/383 |
| 6,296,184 B1 | * | 10/2001 | Dejaeger | 235/383 |

FOREIGN PATENT DOCUMENTS

JP    2000-137758    5/2000

OTHER PUBLICATIONS

JP 2000–137758–English Language Abstract.

* cited by examiner

*Primary Examiner*—Thien M. Le
*Assistant Examiner*—Lisa M. Caputo

(57) ABSTRACT

A product inspection device can confirm the presence of a tag to which a product is not attached or a product to which a tag is not attached when information is to be read from an electronic tag attached to a packaged product and an inspection is to be conducted. The device comprises a scale 2 that determines the weight of a packaged product 14 or the total weight of a plurality of packed products 14 in a state in which one or a plurality of products 11 to which a non-contact, wireless electronic tag 7 is attached are packed; and a read/write device 3 for the electronic tag 7 attached to the plurality of products 14. The packaged product or products are inspected based on the information on the weight of the product or products stored in the electronic tag 7.

3 Claims, 3 Drawing Sheets

PRODUCT INSPECTION DEVICE

TECHNICAL FIELD

The present invention relates to a product inspection device used with a no-contact type of electronic tag, and more particularly to an product inspection device that simultaneously reads a plurality of no-contact type electronic tags attached to products packed in containers, and confirms the contents thereof without unpacking.

BACKGROUND ART

With various types of distribution and inventory control systems, product inventory must be confirmed in response to each change in the season or manufacturing process. However, an important element which harms the efficiency of this sort of product inspection work is unpacking and repacking.

That is, with distribution and inventory processes in general, because the product is packed into containers, the content of the boxes is unpacked in order to confirm its existence, and then is repacked in order to be re-inventoried and redistributed.

As a means of performing this type of product inspection work efficiently, a device has been proposed which would confirm whether or not the contents exists while it is still packed in the container.

FIG. 5 shows this sort of prior art product inspection device that can inspect a product without unpacking it. The product inspection device is composed of a plurality of products 15 to be inspected having electronic tags 7 attached thereto, an electronic tag read/write device 3, and a container 4. Electronic tag 7 is a no-contact type of electronic tag.

In the prior art product inspection device shown in FIG. 5, when a plurality of products 15 packed in container 4 are disposed in the vicinity of electronic tag read/write device 3, read/write device 3 can read information stored on electronic tags 7 through the walls of the container because electronic tag 7 is of the no-contact type.

Therefore, if information relating to a product attached to electronic tag 7 is stored thereon, it becomes possible to confirm the contents of container 4 without unpacking and removing the contents thereof, and eliminates the need to unpack and repack during product inspection.

However, the prior art example shown in FIG. 5 has a defect in that positive proof of the information read from the electronic tag cannot be obtained.

That is, the transmission ability of electronic tag 7 largely depends on the distance between the electronic tag reading device 3, the angle at which they face each other, whether other electronic tags are piled on top thereof, and the like. There is also a danger that some electronic tags 7 may not be read, and a miscount will occur due to a misreading of the electronic tag 7.

Moreover, in cases where a product 6 inside container 4 has no electronic tag 7 attached thereto, the product 6 will not be recognized, and similarly, in cases where an electronic tag 7 inside container 4 has no product 6 attached thereto, even though the product itself is missing, it will be recognized as being present.

That is, the prior art example shown in FIG. 5 has a defect in that it can confirm the presence of a tag, but it cannot confirm if another tag is not present or if the product is present.

DISCLOSURE OF INVENTION

An inventory control system according to the present invention is composed of a plurality of products that have electronic tags attached thereto, means for determining the total weight of said plurality of products, and an electronic tag read/write device. The electronic tag is a no-contact type wireless tag, and the information stored on the electronic tag includes at least information relating to the weight of the product to which it is attached.

According to the present invention, it is possible to avoid the problems with the prior art inspection device created by products that do not have electronic tags attached thereto or electronic tags which have been separated from products.

In packing products for distribution and storage, it becomes possible to record product weight on an electronic tag attached to the product.

In inspecting products after distribution and storage, it becomes possible to compare the weight of the product to be inspected and the container after distribution and storage with the weight before distribution and storage.

If by chance a mistake is made in reading an electronic tag by means of the second effect, with the electronic tag reader, it becomes possible to know of the presence of a product in which a mistake was made in reading its weight, even in the case where a mistake was made in the identification of the product attached to said electronic tag.

When a product not having an electronic tag attached thereto is accidentally placed into a container, it becomes possible to detect this.

It becomes possible to detect a solitary electronic tag in the container that is not attached to a product.

An inspection of an organization is remarkably more valuable than that of the prior art inspection device.

DRAWINGS

DETAILED DESCRIPTION OF EXEMPLARY EMBODIMENTS

Figure 1:
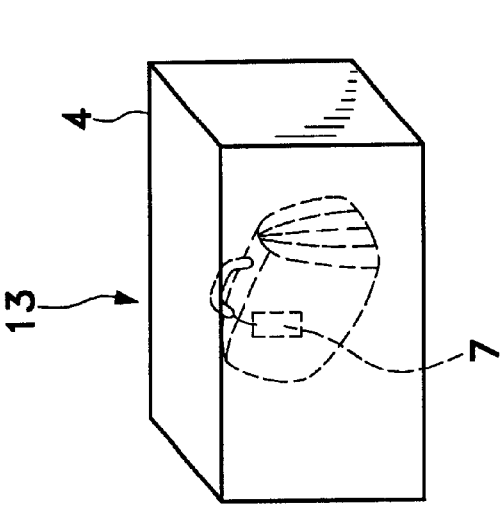
FIG. 1 shows a first product inspection device used in packing prior to shipping and storage.
Figure 1:
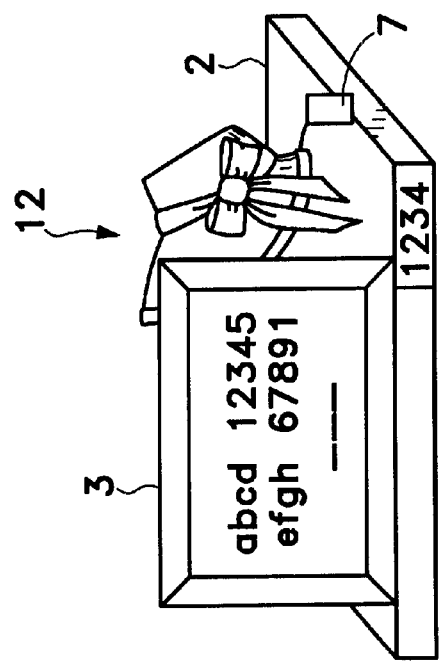
Figure 1:
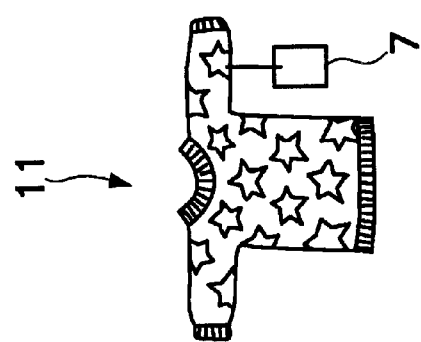

The first embodiment shown in FIG. 1 includes a plurality of products 1 to which electronic tags 7 are attached (product 11 is a product before packing, products 12 are products during packing, and product 13 is a product after packing is completed), a scale 2, an electronic tag read/write device 3, and a container 4. The products 12 that are being packed are placed on scale 2 disposed in the vicinity of electronic tag read/write device 3, and product 13 that has already been packed is in container 4. The electronic tag 7 is a no-contact type wireless tag which can be read from and written to without being contacted.

In a first embodiment composed in this manner, product 11 which is to be packed is placed on scale 2, and then becomes product 12 which is being packed.

Then, product 12 is weighed by scale 2, and the weight thereof is transmitted to electronic tag read/write device 3 and stored on electronic tag 7 attached to product 12.

Next, packing is completed, and if product 12 is packed into container 4 and becomes packed product 13, it becomes possible to store its weight on the electronic tag 7 to which it is attached.

Figure 2:
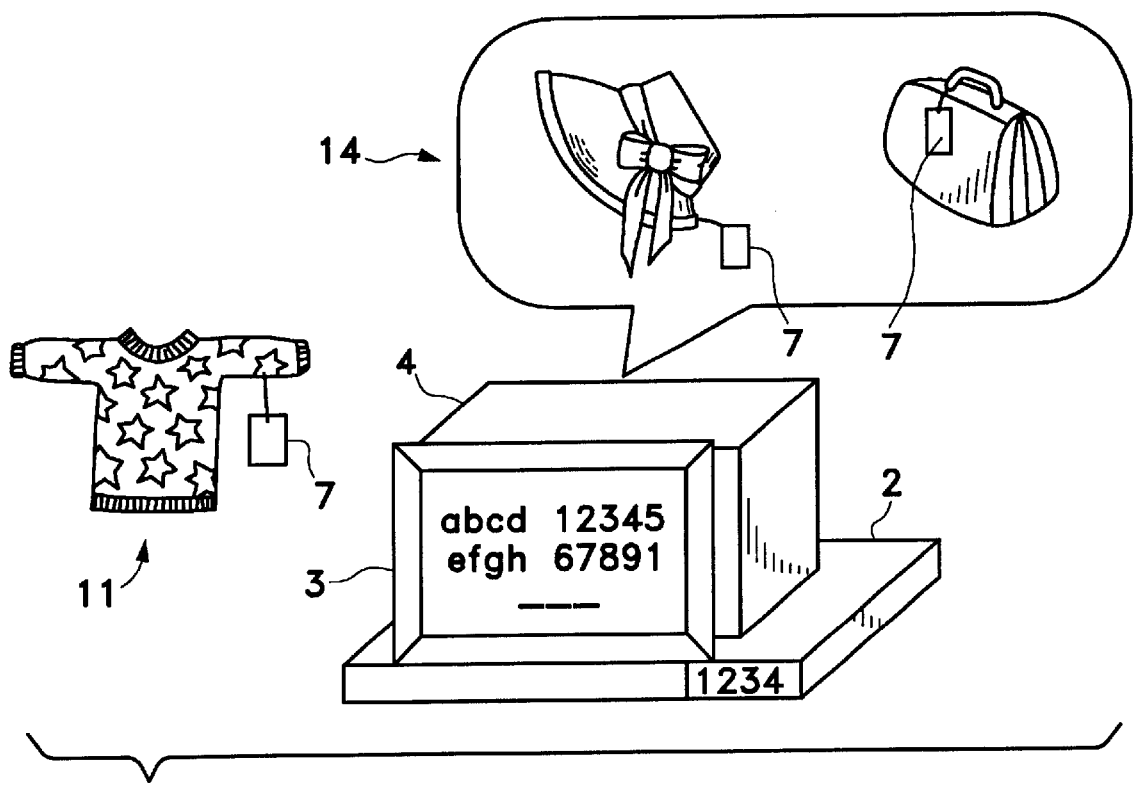
FIG. 2 shows a second product inspection device used in packing prior to shipping and storage.

FIG. 2 shows a second embodiment of the inspection device used in packing for shipping and storage according to the present invention.

The second embodiment shown in FIG. 2 includes a plurality of products 1 to which electronic tags 7 are attached (product 11 is a product before packing, and products 14 are products that have already been packed), a scale 2, an electronic tag read/write device 3, and a container 4. The products 14 that are being packed or have had packing completed are placed in container 4 on scale 2 disposed in the vicinity of electronic tag read/write device 3. The electronic tag 7 is a no-contact type wireless tag which can be read from and written to without being contacted.

In the second embodiment composed in this manner, the product to be packed 11 is placed into container 4, and the difference between the weight of product 11 before it is packed and after it is packed is measured by scale 2. This figure is transmitted to electronic tag read/write device 3 and to electronic tag 7 attached to product 11, i.e., it is stored on electronic tag 7 placed within the transmitting range of electric tag read/write device 3.

Figure 3:
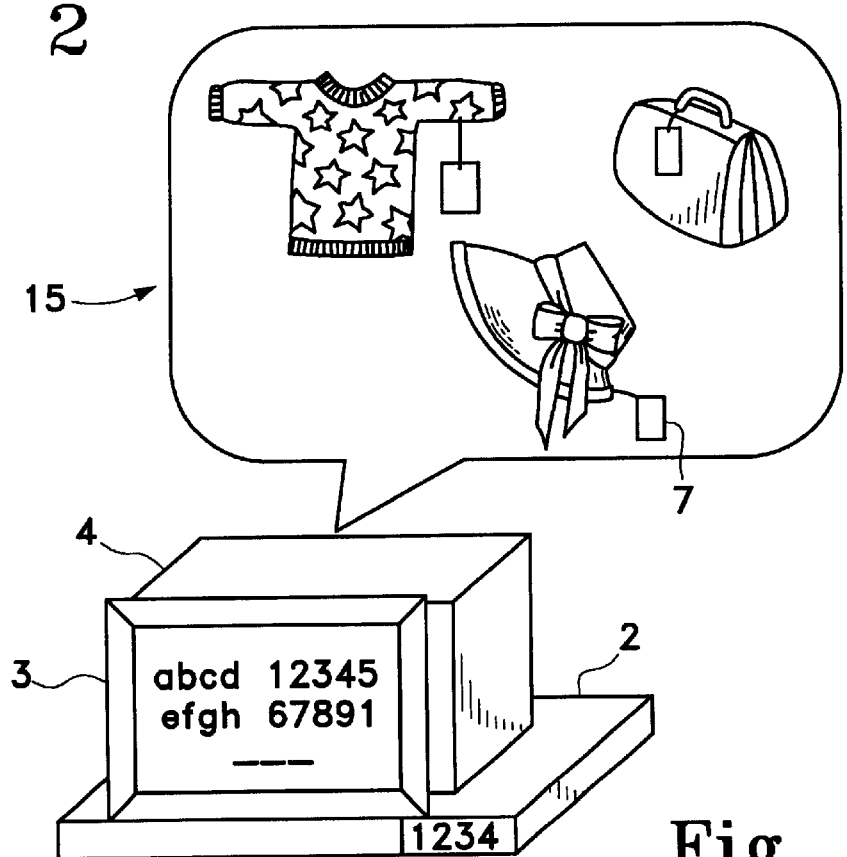
FIG. 3 shows a third product inspection device used for inspecting products after they are stored or distributed.

FIG. 3 shows a third embodiment of the inspection device used according to the present invention, and used for inspecting products packed according to the first and second embodiments after they are stored or distributed.

The third embodiment shown in FIG. 3 includes a plurality of products 15 to which electronic tags 7 are attached (products to be inspected), a scale 2, an electronic tag read/write device 3, and a container 4. The products 15 are placed in container 4 on scale 2 disposed in the vicinity of electronic tag read/write device 3. The electronic tag 7 is a no-contact type wireless tag which can be read from and written to without being contacted.

In the third embodiment shown in FIG. 3 composed in this manner, the electronic tag read/write device 3 reads out the weight of product 15 packed in container 4 from electronic tag 7 attached thereto.

On the other hand, scale 2 measures the total weight of container 4 and product to be inspected 15 packed in container 4, and thus it is possible to compare this value with the total weight read by electronic tag read/write device 3.

Thus, if by some chance a product that does not have an electronic tag 7 attached thereto is in container 4, the weight measured by scale 2 will be larger than the total weight read by electronic tag read/write device 3. On the other hand, if only an electronic tag separated from a product is in container 4, the total weight read by electronic tag read/write device 3 will be larger.

Figure 4:
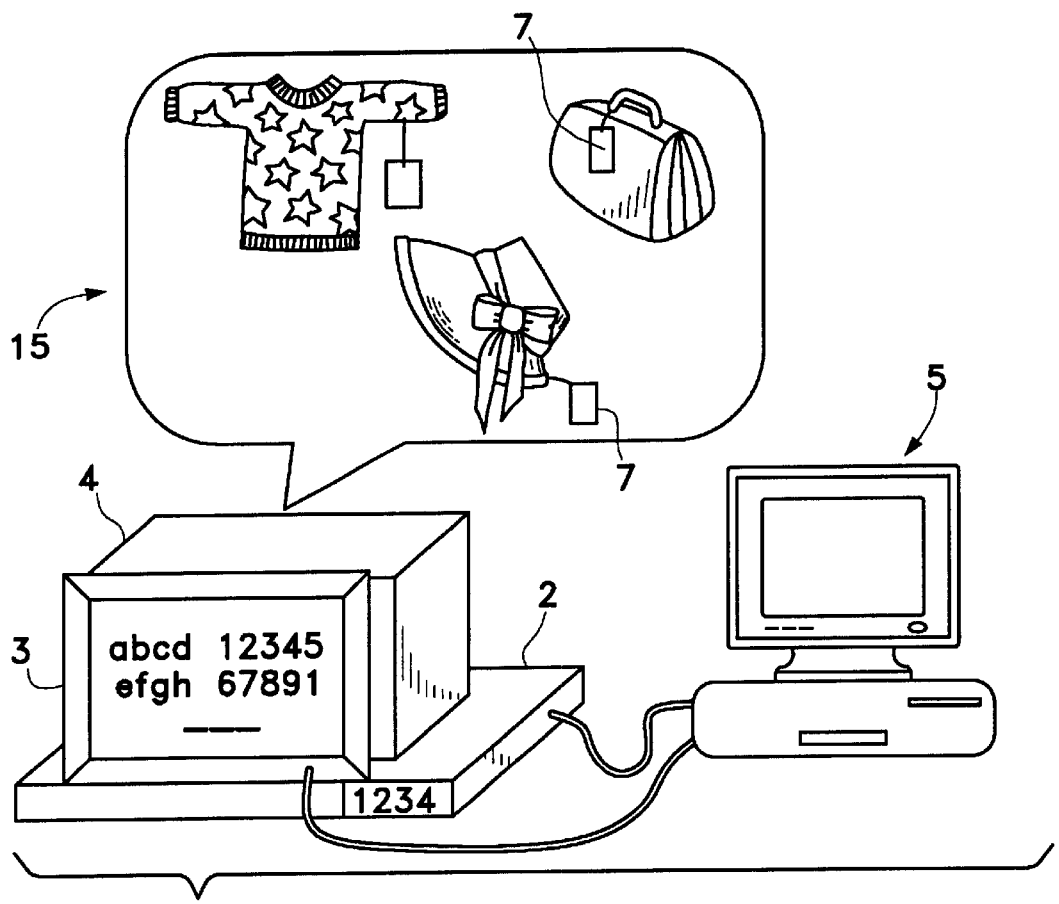
FIG. 4 shows a fourth product inspection device used for inspecting products after they are stored or distributed.
Figure 5:
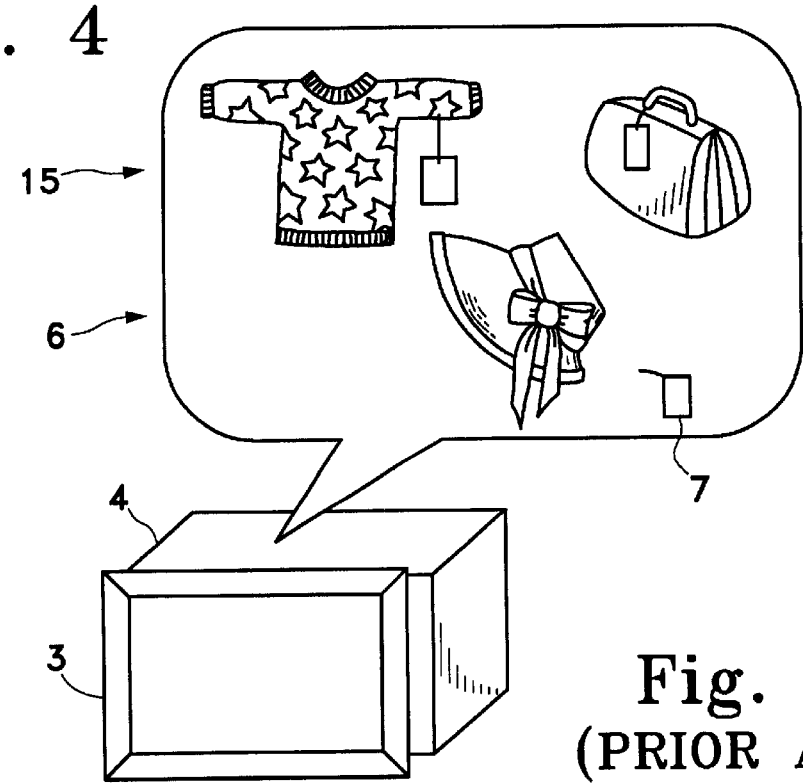
FIG. 5 shows a conventional product inspection device using a non-contact electronic tag.

FIG. 4 shows a fourth embodiment of an inspection device according to the present invention, which is similar to the third embodiment and used for inspecting products packed according to the first and second embodiments after they are stored or distributed.

The fourth embodiment shown in FIG. 4 includes a plurality of products 15 to which electronic tags 7 are attached (products to be inspected), a scale 2, an electronic tag read/write device 3, a container 4, and a calculation controller 5. The products 15 are placed in container 4 on scale 2 disposed in the vicinity of electronic tag read/write device 3, and the calculation controller 5 is connected to the scale 2 and the electronic tag read/write device 3. The electronic tag 7 is a no-contact type wireless tag which can be read from and written to without being contacted.

The operation of the fourth embodiment composed in this manner is generally the same as the third embodiment and a detailed explanation is omitted. However, the new calculation controller 5 processes the total weight read by electronic read/write tag 3, and this makes it possible to compare this total with the weight value of scale 2. Thus, in inspections by the inspection device according to the present invention, it becomes possible to automate the judgment of the inspection results.

Further, even under circumstances in which the weight of container 4 is not included in the total weight read by electronic tag read/write device, the weight value of scale 2 is included therein, and thus becomes an element which harms the accuracy of the inspection.

In this type of case also, in the fourth embodiment shown in FIG. 4, if the weight of container 4 is well-known it becomes possible to correct the weight of container 4 by means of calculation controller 5.

What is claimed is:

1. A method for detecting products missing from a container, comprising:

measuring the individual weight of each said product as it is being packed into a common container;

writing each said measured individual weight onto a respective attached electronic tag as the product is being placed into the container;

thereafter measuring the combined weight of all the products packed in said common container and reading each said measured individual weight from the respective said tag; and comparing the measured combined weight with the measured individual weights written on the respective attached tags to determine if one of said tags is still inside said common container, but is no longer attached to its respective product.

2. The product inspection method according to claim 1, wherein the electronic tag is a no-contact type wireless tag.

3. The product inspection method to claim 1, wherein information relating to at least the weight of the attached product is stored in the electronic tag.

* * * * *